United States Patent [19]

Schmekel et al.

[11] Patent Number: 5,121,758

[45] Date of Patent: Jun. 16, 1992

[54] GLUE AND METHOD FOR ITS PRODUCTION

[75] Inventors: Gerald Schmekel, Elmshorn; Wilfried Stiller, Holm; Meinhard Meyer, Appen-Unterglinde; Knut Möller, Hamburg, all of Fed. Rep. of Germany

[73] Assignee: B.A.T. Cigarettenfabriken GmbH, Hamburg, Fed. Rep. of Germany

[21] Appl. No.: 502,719

[22] Filed: Apr. 2, 1990

[30] Foreign Application Priority Data

Apr. 3, 1989 [DE] Fed. Rep. of Germany ....... 3910745

[51] Int. Cl.⁵ .......................... A24D 1/00; A24D 1/02
[52] U.S. Cl. ...................................... 131/360; 131/365
[58] Field of Search ............... 131/353, 360, 361, 362, 131/365

[56] References Cited

U.S. PATENT DOCUMENTS 3,353,541 11/1967 Hind et al. .......................... 131/353

FOREIGN PATENT DOCUMENTS 90803 1/1923 Fed. Rep. of Germany.

OTHER PUBLICATIONS

*The Pectic Substances* by Kertesz published 1951 by Interscience Publishers Inc. N.Y. p. 578 cited.

*Primary Examiner*—V. Millin
*Attorney, Agent, or Firm*—Armstrong, Nikaido, Marmelstein, Kubovcik & Murray

[57] ABSTRACT

A glue for sealing the side seams of smokable articles contains 5 to 40 percent by weight dry substance pectin in an aqueous dispersion; to produce this glue the aqueous dispersion of the pectin is prepared by charging the pectin portion-wise into heated, demineralized water, stirring the corresponding mixture and executing a chain decomposition of the pectin.

4 Claims, No Drawings

GLUE AND METHOD FOR ITS PRODUCTION

BACKGROUND OF THE INVENTION

1. Field of the Invention

The invention relates to a glue for sealing the side seams of smokable articles as well as a method for the production of such a glue.

2. Description of the Prior Art

During the last few years the production of factory cigarettes has undergone great technological changes. While the principle of the rod-forming machine, the rod maker, has not been fundamentally changed, the production rate reached with the use of new machine generations very high piece numbers (10,000 cigarettes/minute) corresponding to a rod speed of 630 m/minute. The use of these high-speed machines must therefore go hand in hand with the adaptation of the basic materials for the tobacco rod production. In particular, the seam sealing process must be improved in accordance with the new requirements.

The seam glues used nowadays are based on the following chemical types:
1) Polyvinyl alcohols = non-natural origin
1) Starch, dextrin = natural origin
3) Gelatine = natural origin Polvinyl alcohols (PVA) comply with all requirements both in machine-technological and in smoke-sensory respect. In particular, the use of simple dosing systems (gravity feeder) and the resistance against bacteria decomposition and fungus or mold formation explain the preferred use of PVA dispersion glues in the cigarette industry. However, attempts are being made to question the approval of PVA glues for use in the tobacco industry.

At the present stage of development, starch/dextrin and gelatine have several disadvantages as compared with the PVA glue, which are an obstacle to their broader application. In this connection the following disadvantages must above all be mentioned:
1) The attainable processing rates are at 5000 cigarettes/minute at the maximum, i.e. do not allow the use of modern cigarette machines.
2) The solids concentration is about 30% at the maximum with starch/dextrin, i.e. far below that of PVA glues by about 50%; due to this, the bleeding effect can become a problem.
3) Their viscosity is higher and requires other, more expensive application systems.
4) Their high germ count load must be reduced by additives or physical measures (long-term stability).
5) The formation of smoke-sensorily active combustion products which negatively influence the smoke product quality.
6) The temperature of the seam heater necessary for evaporating the liquid portion must be higher due to the weaker wet-gluing behavior and the higher water content.

SUMMARY OF THE INVENTION

The invention therefore has as its object the provision of a glue for sealing the side seams of smokable articles in which the aforementioned disadvantages do not occur. In particular, a glue on the basis of natural materials is proposed, which can be processed in the same fashion as the PVA glues common to date, does not cause any smoke-sensory problems and also ensures a sufficient mechanical strength of the side seams with today's cigarette machines with rod speeds of more than 10 m/sec. (= 10,000 cigarettes/minute).

This is achieved according to the invention in a glue for sealing the side seams of smokable articles by a portion of 5 to 50 percent by weight dry substance pectin.

According to a further aspect, the invention is based on the object to provide a method for producing such a glue which is simple to implement and leads to easily processable glues with reproducible properties.

According to the invention this is achieved in a method for producing such a glue by preparing an aqueous dispersion of pectin by charging pectin portion-wise into heated, demineralized water, stirring the resultant mixture and executing a chain decomposition.

Finally the invention also proposes a smokable article whose side seam has a sufficient mechanical strength without any disadvantages with respect to the taste.

This is achieved by use of a glue on the basis of pectin for sealing the side seam of said smokable article.

In the present context the term "pectin" is understood as a general term for purified carbohydrates which are obtained by means of aqueous extraction e.g. from citrus fruit or apples. The basic monomer is derived from D-galacturonic acid. Pectin is normally characterized by the esterification degree which decisively influences the different chemical properties. There is furthermore a chemically modified, amidated pectin which partly contains instead of the methoxyl group the amide group in the macromolecule.

It must be pointed out fundamentally that all commercially available types of pectin are suited for the production of the "high-speed glue" according to the invention. There are only differences in the smoke sensory suitability in connection with the tobacco mixture used, and, in the individual case, the finished product will have to be tested with respect to smoke sensory quality.

Fundamental observations on the glue production process are made beforehand and the transformation will then be explained in more detail.

Due to the poor per se gluing properties of pectin, it is necessary to produce pectin solutions which are as highly concentrated as possible. The solubility of pectin in water is normally less than 10%, producing non-flowing, and thus non-usable gels. An increase in the temperature over and beyond the so-called "gel temperature" is not expedient, because stability problems then occur and a heatable coating device becomes necessary which would, in turn, result in additional investment. It is thus necessary to reduce the "tendency to crystallize" or, in other words, to increase the thermal movement of the 3-dimensional network to suppress gelatin at room temperature. A preferred point of departure for this chemical modification is the separation or the chain decomposition of the pectin at an almost neutral pH value, the so-called beta-elimination which decomposes the macromolecule into smaller individual parts and reduces viscosity. Fundamentally, enzyme systems are also available for this process, which, however, seem to be less suited for kinetic and sensory reasons. A further alternative is the separation in a strongly acidic environment ("wood saccharification") which is, however, also subject to disadvantages.

The especially preferred type of chain decomposition at an almost neutral pH value is initiated by the adjustment of the pH value to approx. 6 with caustic-soda solution, potash lye and/or gaseous ammonia or ammonia solution and is intensified and continued at elevated temperature, namely at 80° to 90° C. During this boiling-down process the pH value of the medium decreases again (partial de-esterification). By the renewed addition of pectin, well flowing dispersions can be produced by this means, which have high concentrations of solids and thus a great adhesive power.

The use of microbiostatically active preservatives is of decisive importance in natural products for long-term stability. Most of the approved additives have their optimum effect in the slightly acidic range pH value 2 to 6) and are therefore directly usable without change in the pH value of the pectin glue. Preservatives explicitly approved for seam glues of smokable articles can be given here, which are namely sorbic acid, sodium sorbate, potassium sorbate and calcium sorbate, benzoic acid, sodium benzoate, para-hydroxy benzoic acid ethyl ester and para-hydroxy benzoic acid propyl ester and their sodium salts.

A further advantage of the production process is the easy introduction of alcohol which has a diluting and at the same time surface-tension-reducing effect. According to the experience made the use of ethyl alcohol is especially advantageous, which has at the same time also a preservation effect.

A similar effect can certainly also be produced with the conventional tensides; however, these substances are not preferred because they may not be used in some countries.

By reduction of the surface tension which has a decisive influence on the penetration and wetting ability, it is also possible to process papers which are considered in general to be difficult to seal.

The sealing seam has a greater brittleness in natural adhesives and is therefore inferior to the PVA glues. It was found by means of tests that additions of monomeric/dimeric sugars (glucose, sorbite, invert sugar, saccharose) result in an increase in flexibility of the side seam and improve at the same time the wet gluing behavior.

It is often important in practice to make the glue coating track visible with simple means during production. In starch glues a blue coloring or staining of the glue coating track can be easily achieved by the application of an iodine solution to the side seam forming thereby the known iodine inclusion compound so that the uniformity of the glue track can be checked. This effect can also be achieved in a glue on the basis of pectin by means of small additions of starch (1 percent by weight at the maximum).

These glues can be applied at temperatures between 15° C. and 50° C. without heating, i.e. they can be used in air-conditioned cigarette machines which have a temperature of 23° C. and an air humidity of 60%.

DESCRIPTION OF THE PREFERRED EMBODIMENTS

The invention is described in more detail in the following by means of examples.

EXAMPLE 1

1120 g of distilled water are heated to about 60° C. and 93g of an amidated pectin are introduced in portions with a very good stirrer. During the introduction the mixture is heated to about 80° C. due to the energy transfer from the stirrer. The resulting pH value is 3.2. This viscous solution is now mixed drop by drop with 30% NaOH (approx. 20 g) until the pH value increases to 6. The solution is further heated at about 80° C. with continuous stirring and simultaneous reduction of the pH value and the viscosity.

After about 15 minutes the pH value remains constant at 5.5; now 93 g of pectin are again introduced. The pH value is 3.8 after the introduction, the viscosity increases. The solution which slowly becomes darker is again alkalized with NaOH (approx. 30 g) to a pH value of 6 and stirred for 15 minutes at 80° C. with a resulting decrease of the pH value. The viscosity decreases again and the desired end concentration of pectin (in this example 20 per cent by weight) is adjusted by the introduction of 93 g pectin.

The cooling of the glue is carried out without agitation to reduce air inclusions.

The viscosity/temperature behaviour of this glue becomes apparent from the following survey 80° C. →600 mPS, 70° C. →840 mPS, 60° C. →1380 mPS, 50° C. →2100 mPS, 40° C. →3300 mPS, 30 C →5010 mPS, 20° C. →8100 mPS The glue has the appearance of a dark yellow, viscous solution, is flowable and does not tend to gel.

This glue is particularly suited as cigarette paper seam glue for cigarette machines with piece numbers of up to 10,000 cigarettes/minute with non-heatable coating systems using cigarette papers with low porosity (porosity <50 IU) The glue consumption is between 1.2 and 1.9 g/1000 cigarette bodies (63 mm).

As compared to PVA glue no sensory peculiarities can be detected.

The glue has a limited stability of about 6 weeks when stored in a refrigerator (at 10° C.).

EXAMPLE 2

A solution of a pectin with low esterification (esterification degree 40%) is produced according to the same method with a concentration of 25 percent by weight, the introduction of the pectin being executed in four stages of equal weight.

The glue has the appearance of a dark yellow solution, is highly viscous and hardly flowable at room temperature. The viscosity at 20° C. is 9950 mPS.

This glue is especially suited as cigarette paper side seam glue for high-speed cigarette machines (10,000 cigarettes/minute) and papers of high porosity >50 IU) or as an alternative adhesive for the sealing of filter tipping papers; the cigarette side seam glue consumption is between 1.3 and 2 g/1000 cigarette bodies 63 mm).

As compared with the glue according to example 1, this glue is sweeter and has a more rounded taste, but there is no increase in irritation and no "off-taste" (as compared with PVA glue).

The glue can be used for about six weeks when stored in a refrigerator at 10° C.

EXAMPLE 3

In order to increase the durability of the finished pectin glue, a solution according to example 1 is produced from a highly esterified pectin [esterification degree 60%) with a nominal concentration of 20 percent by weight. Deviating from example 1 the heated distilled water is mixed with potassium sorbate so that a 0.2% concentration of preservative in the finished glue results. This glue is confronted with different environmental conditions (climate simulator) and examined with respect to germ count increase at various time intervals. It becomes apparent that the basic germ count load does not significantly increase and that no mold or fungus infection becomes apparent in the given examination period (six months).

The glue has the appearance of a dark yellow solution, does not show any tendency to gelling and is flowable at room temperature.

This glue is especially suited as cigarette side seam glue for high-speed cigarette machines (10,000 cigarettes/minute) and/or for countries with extreme climatic conditions (tropical countries).

As compared with PVA glues, this glue leaves a pleasant impression, has a more rounded taste, no "off-taste" and gives off a slight aromatic note. This glue has a durability of six months even under the most extreme storage conditions, i.e. elevated room temperatures (up to 40° C.) and high air humidity.

EXAMPLE 4

It is known in the tobacco industry that under given chemical conditions potassium or ammonium salts should be used, if possible, as additives from a sensory point of view. For this reason, the following components as shown in the following example are especially suited. 1120 g of an aqueous saccharose solution (5%) are heated to 60° C. and slowly charged with a good stirrer with 100 g of a highly esterified pectin (70%) (pH value 3.3). This solution is carefully brought to a pH value of 6 with an ammonia solution 32 percent by weight) and heated at 90° C. for about 30 minutes until no ammonia smell can be perceived any longer. Pectin (100 g) is again introduced into this hot solution and again alkalized with ammonia. After the volatilization of the ammonia smell the last portion of pectin (100 g) is introduced and a pH value of 3.5 is adjusted with citric acid. This dispersion is cooled without agitation in order to avoid air inclusions.

The glue has the appearance of a yellowishly colored solution, is flowable and does not show any tendency to gelling. It is especially suited as cigarette side seam glue for all cigarette machines and has a high side seam flexibility (hardly any "fatigue fractures" when moving the side seam). This glue can be included as an active instrument into product development, since there is an independent taste character.

The sensory assessment shows that the glue has a dark character and a slight sweetness and is full-bodied. As compared to PVA glues, this represents a positive change.

The durability in a refrigerator (10° C.) is eight weeks.

We claim:

1. A smokable article comprising:
   a rod portion of tobacco material,
   a wrapper encircling the rod portion, and
   a glue layer for sealing the side seam of the wrapper, wherein a glue made of pectin forms the glue layer.

2. A smokable article as defined in claim 1, wherein the glue is made of an aqueous dispersion of the pectin.

3. A smokable article as defined in claim 1, where the glue is made of apple or citrus pectin.

4. A cigarette comprising:
   a rod portion of tobacco material,
   a paper wrapper encircling the rod portion, and
   a glue sealing the side seam of the paper wrapper, wherein the glue is made of citrus of apple pectin, and the pectin has an esterification degree of 50 to 65%.

* * * * *